(12) United States Patent
Tanaka et al.

(10) Patent No.: US 10,106,663 B2
(45) Date of Patent: Oct. 23, 2018

(54) FOAMABLE POLYPROPYLENE RESIN COMPOSITION AND MOLDED BODY

(71) Applicant: TOYODA GOSEI CO., LTD., Kiyosu-shi, Aichi-ken (JP)

(72) Inventors: Yasuaki Tanaka, Kiyosu (JP); Hitoshi Uchida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/635,620

(22) Filed: Jun. 28, 2017

(65) Prior Publication Data
US 2018/0037707 A1    Feb. 8, 2018

(30) Foreign Application Priority Data

Aug. 3, 2016  (JP) ................................ 2016-152609
Mar. 17, 2017  (JP) ................................ 2017-052620

(51) Int. Cl.
| C08J 9/04 | (2006.01) |
| C08J 9/00 | (2006.01) |
| C08K 3/013 | (2018.01) |
| C08K 3/34 | (2006.01) |
| C08K 5/00 | (2006.01) |
| C08L 23/08 | (2006.01) |
| C08L 23/10 | (2006.01) |
| C08L 23/16 | (2006.01) |

(52) U.S. Cl.
CPC ............ *C08J 9/0061* (2013.01); *C08K 3/013* (2018.01); *C08K 3/346* (2013.01); *C08K 5/0083* (2013.01); *C08L 23/0815* (2013.01); *C08L 23/10* (2013.01); *C08L 23/16* (2013.01); *C08L 2205/02* (2013.01); *C08L 2666/06* (2013.01)

(58) Field of Classification Search
CPC ..... C08J 9/0061; C08J 9/0066; C08K 3/0031; C08K 5/0083; C08L 23/0815
See application file for complete search history.

(56) References Cited

U.S. PATENT DOCUMENTS

| 8,871,825 | B2 * | 10/2014 | Nakajima | ............... C08J 9/0061 |
| | | | | 521/134 |
| 2007/0213416 | A1 * | 9/2007 | Handa | ..................... C08J 9/127 |
| | | | | 521/56 |

FOREIGN PATENT DOCUMENTS

| JP | S-612741 | * | 1/1986 |
| JP | H08-020690 A | | 1/1996 |
| JP | 2009-132893 A | | 6/2009 |
| JP | 2016-121228 A | | 7/2016 |

* cited by examiner

*Primary Examiner* — Kara B Boyle
(74) *Attorney, Agent, or Firm* — Posz Law Group, PLC

(57) ABSTRACT

A foamable polypropylene resin composition includes 10 parts by mass to 65 parts by mass of rubber or a thermoplastic elastomer, 18 parts by mass to 90 parts by mass of talc having a 50% particle diameter (D50) of 1 μm to 3 μm and surface-treated for increased dispersibility, 0.1 part by mass to 6.0 parts by mass of an organic crystal nucleating agent, and 5 parts by mass to 15 parts by mass of a foaming agent relative to 100 parts by mass of the polypropylene resin.

16 Claims, 1 Drawing Sheet

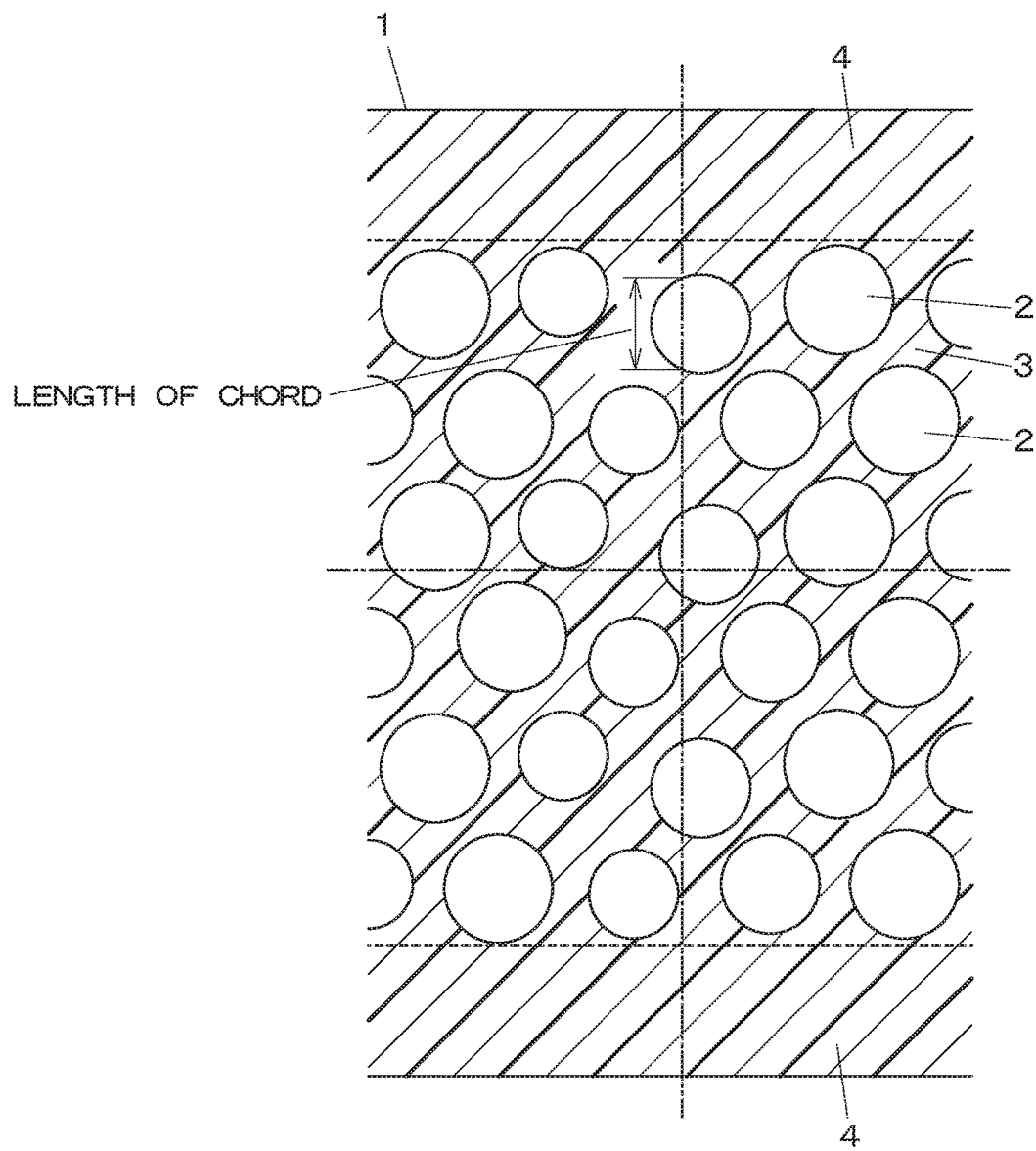

FOAMABLE POLYPROPYLENE RESIN COMPOSITION AND MOLDED BODY

TECHNICAL FIELD

The present invention relates to a foamable polypropylene resin composition and a molded body using the same.

BACKGROUND ART

In vehicles such as automobiles, there has been a growth in the ratio of use of foamed molded bodies formed of thermoplastic resins in view of weight reduction. For conventional foamed molded bodies formed of resin compositions with fillers therein, the amount of talc has been increased for rigidity and the amount of a rubber component has been increased for impact resistance to achieve both rigidity and impact resistance (Patent Document 1). However, rigidity and impact resistance are properties conflicting to each other. In addition, when a foaming ratio is increased, it is difficult to control a foamed cell structure to be homogeneous, making it difficult to achieve both the rigidity and the impact resistance of foamed molded bodies.

Patent Document 2 describes a resin composition in which a thermoplastic elastomer and talc serving as an inorganic filler are blended to a polypropylene resin and a foaming agent is added thereto as Table 1 below:

TABLE 1

| | | Claims | Examples, Comparative Examples |
|---|---|---|---|
| Formulation in parts by mass | Polypropylene resin | 100 | 100 |
| | Thermoplastic elastomer | 5.3 to 75.0 | 34.8 or 36.4 |
| | Inorganic filler | 11.0 to 75.0 | 10.1 to 16.7 (talc) (1.8 or 2.7 μm) |
| | Organic peroxide | 0 to 2.0 | 0 to 0.030 |
| | Foaming agent | 0.1 to 10.0 | 12.5 |

Patent Document 2 states that the 50% particle diameter (D50) of the talc is preferably 0.01 μm to 50 μm, in which one with 1.8 μm or 2.7 μm is used in Examples. As to the surface treatment of the talc, it states that the talc may be left untreated or subjected to treatment for increased dispersibility, and untreated talc is used in Examples. According to examination by the inventors of the present invention, fine talc with a 50% particle diameter of 3 μm or smaller is difficult to be dispersed during kneading and flocculates when it is added in a large amount, whereby such talc is not necessarily effective as foaming nuclei and causes an open cell structure, for example, making it difficult to achieve both rigidity and impact resistance.

The amount of organic peroxide disclosed in Examples is 0.030 part by mass at most, leaving room for improvement in making foamed cells homogeneous and balancing impact resistance, rigidity, and the like.

In addition, there is no specific description about rigidity and impact resistance.

Next, although there has been a growth in the ratio of use of foamed molded bodies formed of a polypropylene resin as described above, they are little used for material-colored design parts. This is partly because the scratch resistance of conventional polypropylene resin compositions is insufficient, and scratches are conspicuous. To impart scratch resistance, an example is described in which surface resistance is reduced through addition of a fatty acid amide such as erucamide or silicone as surface modifiers to a resin composition with talc therein (Patent Document 3). However, even when the fatty acid amide is added to the resin composition with surface-untreated talc therein, sufficient scratch resistance cannot be necessarily achieved. The inventors of the present invention studied on the reasons, and thought that this is because the fatty acid amide is absorbed by the surface-untreated talc in the early stage after molding and insufficiently transfers to the surface of molded bodies. Moreover, the addition of the fatty acid amide alone may cause failures such as the degradation of appearance quality and the occurrence of sticking with the lapse of time. The inventors studied on the reasons, and thought that this is because the fatty acid amide continues to transfer to the surface of molded bodies to accumulate with the lapse of time.

CITATION LIST

Patent Document

Patent Document 1: Japanese Patent Application Publication No. H08-20690
Patent Document 2: Japanese Patent Application Publication No. 2009-132893
Patent Document 3: Japanese Patent Application Publication No. 2016-121228

SUMMARY OF INVENTION

Technical Problem

Given these circumstances, an object of the present invention is to achieve a foamed resin molded body balancing rigidity and impact resistance to a high degree. A further object of the present invention is to retain the scratch resistance of the foamed resin molded body for the long term and to prevent the degradation of appearance and sticking.

Solution to Problem

The foamable polypropylene resin composition of the present invention is formulated to contain 10 parts by mass to 65 parts by mass of rubber or a thermoplastic elastomer, 18 parts by mass to 90 parts by mass of talc having a 50% particle diameter (D50) of 1 m to 3 m and surface-treated for increased dispersibility, 0.1 part by mass to 6.0 parts by mass of an organic crystal nucleating agent, and 5 parts by mass to 15 parts by mass of a foaming agent relative to 100 parts by mass of the polypropylene resin.

The talc surface-treated for increased dispersibility is preferably talc, to a surface of which siloxane is added.

The foamable polypropylene resin composition of the present invention is preferably formulated to further contain a higher fatty acid amide and a compatibilizer.

The foamed polypropylene resin molded body of the present invention is foam-molded from the foamable polypropylene resin composition, has mainly closed cells in a foamed state, and has an average foamed cell diameter pursuant to ASTM D3576-77 of 100 μm to 300 μm.

Crystallinity $\chi c$ of a resin part between foamed cells of a core layer of the foamed polypropylene resin molded body is preferably 30.0% or higher, and the ratio $\chi c/\chi s$ of the crystallinity $\chi c$ of the resin part between the foamed cells to crystallinity $\chi s$ of a skin layer resin part is preferably 1.05 or higher.

The flexural rigidity pursuant to ISO 178 of the foamed polypropylene resin molded body is preferably $2.0 \times 10^{-6}$ Nm or higher, and the puncture energy pursuant to ISO 6603-2 of the foamed polypropylene resin molded body is preferably 4 J or higher.

The foamable polypropylene resin composition preferably contains a higher fatty acid amide and a compatibilizer. A critical vertical force of scratch characteristics pursuant to ISO 19252 of the foamed polypropylene resin molded body is preferably 6.0 N or higher, and a color difference change pursuant to ISO 11664-4 of the foamed polypropylene resin molded body before and after a heat resistance test of 110° C.×600 hours is preferably 3.0 or less.

[Actions]

Foamed molded bodies formed of thermoplastic resins such as polypropylene generally reduce in rigidity and impact resistance compared with solid molded bodies after being foamed. This is partly because higher degree of foaming makes it difficult to control a foamed cell structure to be homogeneous, which may form an open cell structure. Means for solving this problem is a method that adds talc or the like as an inorganic filler as a foaming nucleating agent, and it is known that a smaller particle diameter gives a higher foaming nucleation effect. However, fine particles have poor dispersibility and a tendency to flocculate, and does not necessarily function as the nucleating agent. As means for solving these problems, talc having a particle diameter of 1 μm to 3 μm and surface-treated for increased dispersibility (siloxane surface treatment or the like) is used. Such talc has large bulk specific gravity, is easy to handle, is favorably dispersed in the resin by kneading, and effectively functions as the foaming nucleating agent, thereby providing homogeneous foamed cells. Consequently, it is possible to obtain a foamed molded body having mainly closed cells in the foamed state, the average foamed cell diameter of 100 μm to 300 μm, and improved rigidity and impact resistance.

The organic crystal nucleating agent is added, thereby increasing the crystallinity of the resin part between the foamed cells of the foamed molded body and improving the rigidity of the foamed molded body. In the case of inorganic filler-based crystal nucleating agents, on the other hand, impact resistance reduces due to the propagation of resin/filler interfacial failure.

In normal molding (non-foaming), a mold deprives the skin layer resin part of its heat, and the crystallinity $\chi s$ of the skin layer resin part is lower than the crystallinity $\chi c$ of a core layer resin part, and the ratio of crystallinity of the resin part between the foamed cells to the skin layer $\chi c/\chi s$ (hereinafter, referred to as a "crystallinity index") exceeds 1.

In contrast, in foaming molding, the generation and expansion of bubbles cause heat of the resin to be taken away, and the resin part between the foamed cells of the core layer is in a quenched state compared with the core layer resin part in the normal molding, whereby the crystallinity $\chi c$ of the resin part between the foamed cells of the core layer remains comparable to the crystallinity $\chi s$ of the skin layer resin part.

In the foamable resin composition of the present invention, due to the effect of the organic crystal nucleating agent, the crystallinity $\chi c$ of the resin part between the foamed cells of the core layer increases compared with the crystallinity $\chi s$ of the skin layer resin part, enabling the crystallinity index to be $\chi c/\chi s \geq 1.05$ and enabling $\chi c \geq 30.0\%$. In addition, the organic crystal nucleating agent is once completely dissolved in the resin, and the influence of the propagation of resin/filler interfacial failure reduces, thereby improving impact resistance.

Furthermore, the higher fatty acid amide and the compatibilizer are added, whereby the surface friction resistance of the foamed molded body is reduced to improve scratch resistance. As described above, when the surface-untreated talc is blended, the higher fatty acid amide is absorbed by the talc and insufficiently transfers to the surface of the molded body, whereby scratch resistance is not necessarily exerted. The surface-treated talc is blended in the present invention, and the surface treatment prevents the higher fatty acid amide from being absorbed by the talc and does not hinder the higher fatty acid amide from transferring to the surface of the molded body. The higher fatty acid amide and the compatibilizer are added in combination, whereby an action is produced that prevents the higher fatty acid amide from transferring to the surface of the molded body by the compatibilizer, and the higher fatty acid amide can be prevented from transferring and accumulating to the surface with the lapse of time. Consequently, scratch resistance can be retained for the long term, and the degradation of appearance quality and sticking can be prevented.

Advantageous Effects of Invention

The present invention produces an excellent effect of making it possible to achieve a foamed resin molded body balancing rigidity and impact resistance to a high degree by combining the actions. Furthermore, the action of the higher fatty acid amide and the compatibilizer can retain the scratch resistance of the foamed resin molded body for the long term and prevent the degradation of appearance quality and sticking.

BRIEF DESCRIPTION OF DRAWING

FIG. 1 is a schematic partial enlarged sectional view of a foamed resin molded body of Example.

DESCRIPTION OF EMBODIMENTS

1. Polypropylene Resin

The polypropylene resin, which is not limited to a particular polypropylene resin, has a melt flow rate (MFR) at 230° C. and 21.2 N measured pursuant to ISO 1133 of preferably 5 g/10 minutes to 150 g/10 minutes and more preferably 15 g/10 minutes to 120 g/10 minutes. This is because the fluidity of the composition is appropriate.

2. Rubber or Thermoplastic Elastomer

Preferred examples of the rubber include, but are not limited to, an ethylene-α-olefin copolymer. Examples of the ethylene-α-olefin copolymer include an ethylene-propylene copolymer (EPM), an ethylene-butene copolymer (EBM), an ethylene-octene copolymer (EOM), and an ethylene-propylene-nonconjugated diene copolymer (EPDM).

Preferred examples of the thermoplastic elastomer include, but are not limited to, styrene-based elastomers, olefin-based elastomers, urethane-based elastomers, and polyester-based elastomers.

3. Talc

Examples of the talc surface-treated for increased dispersibility include talc surface-treated with silane coupling agents, titanium coupling agents, higher fatty acids, higher fatty acid esters, higher fatty acid amides, higher fatty acid salts, or other surfactants. Among these, talc in which siloxane is added to a surface thereof by a silane coupling agent is preferred.

The amount of the talc to be blended is preferably 20 parts by mass or more.

The foamable polypropylene resin composition may contain inorganic fillers other than the talc in addition to the talc. Examples of the inorganic fillers include particulate fillers such as calcium carbonate, barium sulfate, and glass beads and plate-shaped fillers such as kaolin, glass flakes, lamellar silicates, and mica.

4. Organic Crystal Nucleating Agent

Examples of the organic crystal nucleating agent include, but are not limited to, sorbitol-based agents, amide-based agents, and metal benzoates.

5. Foaming Agent

Examples of the foaming agent include, but are not limited to, physical foaming agents and chemical foaming agents. Among these, chemical foaming agents are preferred. Examples of the chemical foaming agents include organic chemical foaming agents and inorganic chemical foaming agents. Examples of the inorganic chemical foaming agents include sodium bicarbonate (sodium hydrogen carbonate) and nitrite hydride.

The foaming agent having a gas generating amount of 150 ml/5 g to 250 ml/5 g is preferably added in an amount of 5 parts by mass to 15 parts by mass.

6. Higher Fatty Acid Amide

Examples of the higher fatty acid amid include, but are not limited to, erucamide, stearamide, oleamide, and ethylenebis(stearamide). Among these, erucamide is preferred.

7. Compatibilizer

The compatibilizer, which is not limited to a particular compatibilizer, is preferably a copolymer of ethylene and at least one vinyl monomer having less affinity with the higher fatty acid amide; specific examples thereof include, but are not limited to, an ethylene-acrylic acid copolymer, an ethylene-methyl acrylate copolymer, an ethylene-methyl methacrylate copolymer, an ethylene-ethyl acrylate copolymer, an ethylene-isobutyl acrylate copolymer, an ethylene-n-butyl acrylate copolymer, an ethylene-2-ethylhexyl acrylate copolymer, an ethylene-ethyl acrylate-maleic anhydride copolymer, an ethylene-ethyl acrylate-glycidyl methacrylate copolymer, an ethylene-glycidyl methacrylate copolymer, an ethylene-vinyl acetate-glycidyl methacrylate copolymer, and an ethylene-vinyl acetate copolymer or a saponified product thereof. These copolymers may be used singly, or two or more of them may be used in combination.

The blending mass ratio of the higher fatty acid amide to the compatibilizer, which is not limited to a particular ratio, is preferably 1:10 to 2:1 and more preferably 1:3 to 2:1.

The total amount to be added, relative to 100 parts by mass of the polypropylene resin, of the higher fatty acid amide and the compatibilizer having the blending mass ratio, is preferably, but not limited to, 0.8 part by mass to 15.0 parts by mass and more preferably 1.0 part by mass to 9.5 parts by mass.

8. Foamed Molded Body

Examples of the use of the foamed molded body include, but are not limited to, automobile exterior parts such as grilles, bumpers, and cowl louvers and automobile interior parts such as instrumental panels, consoles, trims, pillars, center clusters, and deck side trims.

EXAMPLES

Foamable polypropylene resin compositions of Samples 1 to 17 with the formulations (the formulation values are represented in parts by mass) listed in the following Table 2 were prepared to mold foamed polypropylene resin molded bodies. Samples 1 to 10 are Examples, whereas Samples 11 to 17 are Comparative Examples.

TABLE 2

| | | | | | Sample No. | | | | | |
| --- | --- | --- | --- | --- | --- | --- | --- | --- | --- | --- |
| | | | | 1 | 2 | 3 | 4 | 5 | 6 | Criteria |
| Material formulation (parts by mass) | PP-1 | MFR = 100 | | 100 | 100 | 100 | 100 | | 100 | |
| | PP-2 | MFR = 38 | | | | | | 100 | | |
| | Rubber-1 | Ethylene-α-olefin copolymer | | 25.0 | 62.5 | 13.3 | 25.0 | 25.0 | 25.0 | |
| | Rubber-2 | Ethylene-α-olefin copolymer | | | | | | | | |
| | Rubber-3 | Styrene-based elastomer | | | | | | | | |
| | Talc-1 | Surface-treated Particle diameter: 1 μm | | | | | | | | |
| | Talc-2 | Surface-treated Particle diameter: 2 μm | | 41.7 | 87.5 | 20.0 | 41.7 | 41.7 | 41.7 | |
| | Talc-3 | Surface-untreated Particle diameter: 2 μm | | | | | | | | |
| | Talc-4 | Surface-untreated Particle diameter: 6 μm | | | | | | | | |
| | Organic crystal nucleating agent 1 | Sorbitol-based | | 0.33 | 0.50 | 0.27 | 5.0 | 0.33 | | |
| | Organic crystal nucleating agent 2 | Amide-based | | | | | | | 0.33 | |
| | Foaming agent-1 | Gas amount 165 ml/5 g | | 8.3 | 12.5 | 6.7 | 8.3 | 8.3 | 8.3 | |
| | Foaming agent-2 | Gas amount 235 ml/5 g | | | | | | | | |
| Property | Flexural rigidity | | *10$^{-6}$ (Nm) | 2.2 | 2.4 | 2.0 | 2.4 | 2.2 | 2.2 | 2.0 or higher |
| | High-speed surface impact | −30° C. (J) | | 7.2 | 8.1 | 6.8 | 6.5 | 7.5 | 6.3 | 4 or higher |
| | Crystallinity of core layer resin part between foamed cells | χc (%) | | 30.6 | 30.9 | 30.1 | 31.5 | 30.8 | 30.4 | 30.0 or higher |
| | Crystallinity index | χc/χs | | 1.06 | 1.05 | 1.06 | 1.08 | 1.05 | 1.06 | 1.05 or higher |
| | Foamed state | | | closed cell | closed cell | closed cell | closed cell | closed cell | closed cell | closed cell |
| | Average foamed cell diameter | μm | | 187 | 130 | 203 | 145 | 213 | 175 | 100 to 300 |

TABLE 2-continued

| | | | Sample No. | | | | | | |
|---|---|---|---|---|---|---|---|---|---|
| | | | 7 | 8 | 9 | 10 | 11 | 12 | Criteria |
| Material formulation (parts by mass) | PP-1 | MFR = 100 | 100 | 100 | 100 | 100 | 100 | 100 | |
| | PP-2 | MFR = 38 | | | | | | | |
| | Rubber-1 | Ethylene-α-olefin copolymer | | | 25.0 | 25.0 | 25.0 | 25.0 | |
| | Rubber-2 | Ethylene-α-olefin copolymer | 25.0 | | | | | | |
| | Rubber-3 | Styrene-based elastomer | | 25.0 | | | | | |
| | Talc-1 | Surface-treated Particle diameter: 1 μm | | | | | 41.7 | | |
| | Talc-2 | Surface-treated Particle diameter: 2 μm | 41.7 | 41.7 | 41.7 | | | 41.7 | |
| | Talc-3 | Surface-untreated Particle diameter: 2 μm | | | | | 41.7 | | |
| | Talc-4 | Surface-untreated Particle diameter: 6 μm | | | | | | | |
| | Organic crystal nucleating agent 1 | Sorbitol-based | 0.33 | 0.33 | 0.33 | 0.33 | 0.33 | | |
| | Organic crystal nucleating agent 2 | Amide-based | | | | | | | |
| | Foaming agent-1 | Gas amount 165 ml/5 g | 8.3 | 8.3 | | 8.3 | 8.3 | 8.3 | |
| | Foaming agent-2 | Gas amount 235 ml/5 g | | | 8.3 | | | | |
| Property | Flexural rigidity | *10⁻⁶ (Nm) | 2.1 | 2 | 2.1 | 2.2 | 1.8 | 1.5 | 2.0 or higher |
| | High-speed surface impact | −30° C. (J) | 7.1 | 6.7 | 7 | 7.3 | 2.9 | 3.8 | 4 or higher |
| | Crystallinity of core layer resin part between foamed cells | χc (%) | 30.3 | 31.1 | 30.3 | 30.7 | 30.1 | 26.5 | 30.0 or higher |
| | Crystallinity index | χc/χs | 1.06 | 1.06 | 1.06 | 1.06 | 0.98 | 0.96 | 1.05 or higher |
| | Foamed state | | closed cell | closed cell | closed cell | closed cell | open cell | closed cell | closed cell |
| | Average foamed cell diameter | μm | 195 | 171 | 214 | 166 | 340 | 254 | 100 to 300 |

| | | | Sample No. | | | | | |
|---|---|---|---|---|---|---|---|---|
| | | | 13 | 14 | 15 | 16 | 17 | Criteria |
| Material formulation (parts by mass) | PP-1 | MFR = 100 | 100 | 100 | 100 | 100 | 100 | |
| | PP-2 | MFR = 38 | | | | | | |
| | Rubber-1 | Ethylene-α-olefin copolymer | 25.0 | 20.0 | 120 | 25.0 | 25.0 | |
| | Rubber-2 | Ethylene-α-olefin copolymer | | | | | | |
| | Rubber-3 | Styrene-based elastomer | | | | | | |
| | Talc-1 | Surface-treated Particle diameter: 1 μm | | | | | | |
| | Talc-2 | Surface-treated Particle diameter: 2 μm | | 13.3 | 180 | 41.7 | 41.7 | |
| | Talc-3 | Surface-untreated Particle diameter: 2 μm | | | | | | |
| | Talc-4 | Surface-untreated Particle diameter: 6 μm | 41.7 | | | | | |
| | Organic crystal nucleating agent 1 | Sorbitol-based | 0.33 | 0.27 | 0.80 | 8.3 | | |
| | Organic crystal nucleating agent 2 | Amide-based | | | | | 0.03 | |
| | Foaming agent-1 | Gas amount 165 ml/5 g | 8.3 | 6.7 | 20.0 | 8.3 | 8.3 | |
| | Foaming agent-2 | Gas amount 235 ml/5 g | | | | | | |
| Property | Flexural rigidity | *10⁻⁶ (Nm) | 1.6 | 1.2 | 2.3 | 2.4 | 1.7 | 2.0 or higher |
| | High-speed surface impact | −30° C. (J) | 2.3 | 2.5 | 3.2 | 3.8 | 4.2 | 4 or higher |
| | Crystallinity of core layer resin part between foamed cells | χc (%) | 27.8 | 29.8 | 30.3 | 31.9 | 2.71 | 30.0 or higher |
| | Crystallinity index | χc/χs | 0.99 | 0.97 | 0.96 | 1.05 | 0.98 | 1.05 or higher |
| | Foamed state | | open cell | closed cell | closed cell | closed cell | closed cell | closed cell |
| | Average foamed cell diameter | μm | 283 | 238 | 152 | 224 | 264 | 100 to 300 |

The details of the used materials are as follows. The "rubber" in this section collectively refers to the rubber or the thermoplastic elastomer.

PP-1: trade name "BX3920" manufactured by SK global chemical, or a polypropylene resin with an MFR of 100 g/10 minutes.

PP-2: trade name "BH975MO" manufactured by Borouge, or a polypropylene resin with an MFR of 38 g/10 minutes.

Rubber-1: trade name "Engage 8842" manufactured by Dow Elastomer, or an ethylene-α-olefin copolymer.

Rubber-2: trade name "Tafmer DF610" manufactured by Mitsui Chemicals, Inc., or an ethylene-α-olefin copolymer.

Rubber-3: trade name "Septon 2063" manufactured by Kuraray Co., Ltd., or a styrene-based elastomer.

Talc-1: trade name "NANOACE D-1000" manufactured by Nippon Talc Co., Ltd., or talc having a 50% particle diameter (D50) of 1 μm and surface-treated with siloxane. The 50% particle diameter pursuant to ISO 13320-1 was measured by a laser diffraction particle size analyzer (the same throughout this specification).

Talc-2: trade name "NSultraC" manufactured by IMI FABI, or talc having a particle diameter of 2 μm and surface-treated with siloxane.

Talc-3: trade name "HTPultra5L" manufactured by IMI FABI, or surface-untreated talc with a particle diameter of 2 µm.

Talc-4: trade name "GH7" manufactured by Hayashi Kasei Co., Ltd., or surface-untreated talc with a particle diameter of 6 µm.

Organic Crystal Nucleating Agent 1: trade name "GEL ALL MD" manufactured by New Japan Chemical Co., Ltd., or 1,3:2,4-bis-O-(4-methylbenzylidene)-D-sorbitol.

Organic Crystal Nucleating Agent 2: trade name "Rikaclear PC1" manufactured by New Japan Chemical Co., Ltd., or an amide-based crystal nucleating agent.

Foaming Agent MB-1: trade name "Polythlene EE25C" manufactured by Eiwa Chemical Ind. Co., Ltd. This is a sodium bicarbonate masterbatch.

Foaming Agent MB-2: trade name "Polythlene EE65C" manufactured by Eiwa Chemical Ind. Co., Ltd. This is a sodium bicarbonate masterbatch.

Each of the foamable polypropylene resin compositions of Sample 1 to Sample 17 was injected into a flat cavity with a gap of 1.5 mm of a mold (not illustrated). A movable mold of the mold was then core-backed to increase the gap of the cavity, and the composition was foamed to mold a plate-shaped foamed polypropylene resin molded body with a thickness of 2.8 mm. That is, the foaming ratio was 1.87. In this molded foamed polypropylene resin molded body 1, as illustrated in FIG. 1, a core layer includes foamed cells 2 and a resin part 3 between foamed cells, and surface parts adjacent to the mold include skin layer resin parts 4 (the broken lines in FIG. 1 are lines for distinguishing the parts from the core layer) containing few foamed cells. Plate-shaped test specimens having certain measurement-dependent dimensions were cut out of this plate-shaped molded body 1, and their property data were measured as follows.

(A) Flexural Rigidity

Pursuant to ISO 178 (JIS K7171), a test specimen with 10 mm×80 mm×a thickness of 2.8 mm was subjected to a three-point flexural test to measure a flexural modulus of elasticity, and the flexural modulus of elasticity was multiplied by a geometrical moment of inertia to calculate flexural rigidity.

The flexural rigidity of $2.0\times10^{-6}$ Nm or higher was determined to be "good."

(B) Method of High-Speed Surface Impact Test

Pursuant to ISO 6603-2 (JIS K7211-2), impacts were applied to a test specimen with 120 mm×130 mm×a thickness of 2.8 mm at a high and constant speed at a test temperature of −30° C. by an instrumentation impact tester (striker shape: spherical with a diameter of 12.7 mm, support base inner diameter: 76.2 mm, and impact speed: 5 m/second), a force and a deformation amount generated were captured as an impact waveform, and impact energy (puncture energy) which had been consumed until puncture displacement was reached was measured. At the puncture displacement, a maximum impulsive force was reduced by half.

The impact energy of 4 J or higher was determined to be "good."

(C) How to Determine Crystallinity

For each of the resin part 3 between the foamed cells and the skin layer resin part 4, measurement was performed by the following method using a differential scanning calorimeter (DSC) (Q200 manufactured by TA Instruments).

The temperature was raised from 0° C. to 250° C. at a temperature rising rate of 40° C./minute to determine the amount of heat of fusion. From the obtained amount of heat of fusion ΔH (J/g), pieces of crystallinity (the crystallinity $\chi c$ of the resin part 3 between the foamed cells and the crystallinity $\chi s$ of the skin layer resin part 4) were determined from the expression (ΔH/resin fraction/209)×100(%).

In the expression, the resin fraction is a residual polymer fraction obtained by subtracting the weight fraction of an inorganic component (a filler and the like) within the material (0.8 when the filler is 20%). The value 209 is the amount of heat of fusion of a polypropylene resin (J/g) when it is 100% crystallized.

The crystallinity $\chi c$ of the resin part 3 between the foamed cells of 30.0% or higher was determined to be good.

The crystallinity index $\chi c/\chi s$ of 1.05 or higher was determined to be "good."

(D) Average Foamed Cell Diameter

Pursuant to ASTM D3576-77, an average foamed cell diameter was determined. First, a picture of a section of the test specimen cut out of the molded body 1 was taken with a 50-fold magnification (which can photograph the entire thickness direction) by a stereoscopic microscope. On this picture, straight lines (indicated by the chain double-dashed lines in FIG. 1) were drawn in the horizontal direction and the vertical direction, the lengths of all chords of foamed cells that the lines cross were measured, and an average t of the lengths of the chords was determined. From the expression d=t/0.616, an average foamed cell diameter d was calculated.

The average foamed cell diameter of 100 µm to 300 µm was evaluated to be "good."

The molded bodies having mainly closed cells in the foamed state were evaluated to be "good."

Table 2 shows property data. The molded bodies of Samples 1 to 10 (Examples) were determined to be good for all pieces of property data, balancing rigidity and impact resistance to a high degree. In contrast, the molded bodies of Samples 11 to 17 (Comparative Examples) were insufficient in either or both of rigidity and impact resistance.

Next, foamable polypropylene resin compositions of Samples 18 to 34 with the formulations (the formulation values are represented in parts by mass) listed in the following Table 3, in which a scratch-resistant modifier was further contained, were prepared to mold foamed polypropylene resin molded bodies. Table 3 lists Sample 1 again together with additional property data described below. Samples 18 to 23 contain the scratch-resistant modifier based on the formulation of Sample 1, whereas Samples 24 to 32 contain the scratch-resistant modifier based on the formulations of Samples 2 to 10, respectively.

TABLE 3

| | | | Sample No. | | | | | | |
|---|---|---|---|---|---|---|---|---|---|
| | | | 1 | 18 | 19 | 20 | 21 | 22 | Criteria |
| Material formulation | PP-1 | MFR = 100 | 100 | 100 | 100 | 100 | 100 | 100 | |
| | PP-2 | MFR = 38 | | | | | | | |

TABLE 3-continued

| | | | | | | | | | |
|---|---|---|---|---|---|---|---|---|---|
| (parts by mass) | Rubber-1 | Ethylene-α-olefin copolymer | 25.0 | 25.0 | 25.0 | 25.0 | 25.0 | 25.0 | |
| | Rubber-2 | Ethylene-α-olefin copolymer | | | | | | | |
| | Rubber-3 | Styrene-based elastomer | | | | | | | |
| | Talc-1 | Surface-treated Particle diameter: 1 μm | | | | | | | |
| | Talc-2 | Surface-treated Particle diameter: 2 μm | 41.7 | 41.7 | 41.7 | 41.7 | 41.7 | 41.7 | |
| | Talc-3 | Surface-untreated Particle diameter: 2 μm | | | | | | | |
| | Talc-4 | Surface-untreated Particle diameter: 6 μm | | | | | | | |
| | Organic crystal nucleating agent 1 | Sorbitol-based | 0.33 | 0.33 | 0.33 | 0.33 | 0.33 | 0.33 | |
| | Organic crystal nucleating agent 2 | Amide-based | | | | | | | |
| | Foaming agent-1 | Gas amount 165 ml/5 g | 8.3 | 8.3 | 8.3 | 8.3 | 8.3 | 8.3 | |
| | Foaming agent-2 | Gas amount 235 ml/5 g | | | | | | | |
| | Scratch-Resistant Modifier 1 | Erucamide + Compatibilizer | | 0.7 | 1.2 | 3.3 | 9.2 | | |
| | Scratch-Resistant Modifier 2 | Erucamide | | | | | | 0.5 | |
| | Scratch-Resistant Modifier 3 | Ethylenebis(stearamide) | | | | | | | |
| Property | Flexural rigidity | $*10^{-6}$ (Nm) | 2.2 | 2.2 | 2.2 | 2.2 | 2.2 | 2.2 | 2.0 or higher |
| | High-speed surface impact | −30° C. (J) | 7.2 | 7.2 | 7.4 | 7.2 | 6.4 | 7.3 | 4 or higher |
| | Crystallinity of core layer resin part between foamed cells | $\chi c$ (%) | 30.6 | 30.5 | 30.7 | 30.6 | 30.4 | 30.4 | 30.0 or higher |
| | Crystallinity index | $\chi c/\chi s$ | 1.06 | 1.06 | 1.06 | 1.06 | 1.07 | 1.05 | 1.05 or higher |
| | Foamed state | | closed cell | closed cell | closed cell | closed cell | closed cell | closed cell | closed cell |
| | Average foamed cell diameter | μm | 187 | 162 | 159 | 187 | 174 | 174 | 100 to 300 |
| | Scratch resistance (scratch characteristics) | Critical vertical force N | 2.1 | 2.8 | 7.1 | 8.0 | 9.1 | 8.7 | 6.0 or higher |
| | Sticking after heat resistance test | Finger tactile sensory evaluation | Absent | Absent | Absent | Absent | Absent | Present | Absent |
| | Color difference change before and after heat resistance test | | 1.7 | 1.9 | 2.1 | 2.4 | 2.6 | 4.2 | 3.0 or less |

| | | | Sample No. | | | | | | |
|---|---|---|---|---|---|---|---|---|---|
| | | | 23 | 24 | 25 | 26 | 27 | 28 | Criteria |
| Material formulation (parts by mass) | PP-1 | MFR = 100 | 100 | 100 | 100 | 100 | | 100 | |
| | PP-2 | MFR = 38 | | | | | 100 | | |
| | Rubber-1 | Ethylene-α-olefin copolymer | 25.0 | 62.5 | 13.3 | 25.0 | 25.0 | 25.0 | |
| | Rubber-2 | Ethylene-α-olefin copolymer | | | | | | | |
| | Rubber-3 | Styrene-based elastomer | | | | | | | |
| | Talc-1 | Surface-treated Particle diameter: 1 μm | | | | | | | |
| | Talc-2 | Surface-treated Particle diameter: 2 μm | 41.7 | 87.5 | 20.0 | 41.7 | 41.7 | 41.7 | |
| | Talc-3 | Surface-untreated Particle diameter: 2 μm | | | | | | | |
| | Talc-4 | Surface-untreated Particle diameter: 6 μm | | | | | | | |
| | Organic crystal nucleating agent 1 | Sorbitol-based | 0.33 | 0.50 | 0.27 | 5.0 | 0.33 | | |
| | Organic crystal nucleating agent 2 | Amide-based | | | | | | 0.33 | |
| | Foaming agent-1 | Gas amount 165 ml/5 g | 8.3 | 12.5 | 6.7 | 8.3 | 8.3 | 8.3 | |
| | Foaming agent-2 | Gas amount 235 ml/5 g | | | | | | | |
| | Scratch-Resistant Modifier 1 | Erucamide + Compatibilizer | | 5.0 | 2.7 | 3.3 | 3.3 | 3.3 | |
| | Scratch-Resistant Modifier 2 | Erucamide | | | | | | | |
| | Scratch-Resistant Modifier 3 | Ethylenebis(stearamide) | 0.5 | | | | | | |
| Property | Flexural rigidity | $*10^{-6}$ (Nm) | 2.2 | 2.4 | 2.0 | 2.4 | 2.2 | 2.2 | 2.0 or higher |
| | High-speed surface impact | −30° C. (J) | 7.3 | 8.1 | 6.8 | 6.5 | 7.5 | 6.3 | 4 or higher |
| | Crystallinity of core layer resin part between foamed cells | $\chi c$ (%) | 30.4 | 30.9 | 30.1 | 31.5 | 30.8 | 30.4 | 30.0 or higher |
| | Crystallinity index | $\chi c/\chi s$ | 1.05 | 1.05 | 1.06 | 1.08 | 1.05 | 1.06 | 1.05 or higher |
| | Foamed state | | closed cell | closed cell | closed cell | closed cell | closed cell | closed cell | closed cell |
| | Average foamed cell diameter | μm | 191 | 130 | 203 | 145 | 213 | 175 | 100 to 300 |
| | Scratch resistance (scratch characteristics) | Critical vertical force N | 9.3 | 8.5 | 7.8 | 8.1 | 8.3 | 8.0 | 6.0 or higher |
| | Sticking after heat resistance test | Finger tactile sensory evaluation | Present | Absent | Absent | Absent | Absent | Absent | Absent |
| | Color difference change before and after heat resistance test | | 4.5 | 2.3 | 2.4 | 2.5 | 2.2 | 2.6 | 3.0 or less |

TABLE 3-continued

|  |  |  | Sample No. | | | | | | |
|---|---|---|---|---|---|---|---|---|---|
|  |  |  | 29 | 30 | 31 | 32 | 33 | 34 | Criteria |
| Material formulation (parts by mass) | PP-1 | MFR = 100 | 100 | 100 | 100 | 100 | 100 | 100 |  |
|  | PP-2 | MFR = 38 |  |  |  |  |  |  |  |
|  | Rubber-1 | Ethylene-α-olefin copolymer |  |  | 25.0 | 25.0 | 25.0 | 25.0 |  |
|  | Rubber-2 | Ethylene-α-olefin copolymer | 25.0 |  |  |  |  |  |  |
|  | Rubber-3 | Styrene-based elastomer |  | 25.0 |  |  |  |  |  |
|  | Talc-1 | Surface-treated Particle diameter: 1 μm |  |  |  |  | 41.7 |  |  |
|  | Talc-2 | Surface-treated Particle diameter: 2 μm | 41.7 | 41.7 | 41.7 |  |  |  |  |
|  | Talc-3 | Surface-untreated Particle diameter: 2 μm |  |  |  |  | 41.7 |  |  |
|  | Talc-4 | Surface-untreated Particle diameter: 6 μm |  |  |  |  |  | 41.7 |  |
|  | Organic crystal nucleating agent 1 | Sorbitol-based | 0.33 | 0.33 | 0.33 | 0.33 | 0.33 | 0.33 |  |
|  | Organic crystal nucleating agent 2 | Amide-based |  |  |  |  |  |  |  |
|  | Foaming agent-1 | Gas amount 165 ml/5 g | 8.3 | 8.3 |  | 8.3 | 8.3 | 8.3 |  |
|  | Foaming agent-2 | Gas amount 235 ml/5 g |  |  | 8.3 |  |  |  |  |
|  | Scratch-Resistant Modifier 1 | Erucamide + Compatibilizer | 3.3 | 3.3 | 3.3 | 3.3 | 3.3 | 3.3 |  |
|  | Scratch-Resistant Modifier 2 | Erucamide |  |  |  |  |  |  |  |
|  | Scratch-Resistant Modifier 3 | Ethylenebis (stearamide) |  |  |  |  |  |  |  |
| Property | Flexural rigidity | $*10^{-6}$ (Nm) | 2.1 | 2.0 | 2.1 | 2.2 | 1.8 | 1.6 | 2.0 or higher |
|  | High-speed surface impact | −30° C. (J) | 7.1 | 6.7 | 7.0 | 7.3 | 2.9 | 2.3 | 4 or higher |
|  | Crystallinity of core layer resin part between foamed cells | $\chi c$ (%) | 30.3 | 31.1 | 30.3 | 30.7 | 30.1 | 27.8 | 30.0 or higher |
|  | Crystallinity index | $\chi c/\chi s$ | 1.06 | 1.06 | 1.06 | 1.06 | 0.98 | 0.99 | 1.05 or higher |
|  | Foamed state |  | closed cell | closed cell | closed cell | closed cell | open cell | open cell | closed cell |
|  | Average foamed cell diameter | μm | 195 | 171 | 214 | 166 | 340 | 283 | 100 to 300 |
|  | Scratch resistance (scratch characteristics) | Critical vertical force N | 8.0 | 8.4 | 8.1 | 8.5 | 3.9 | 3.5 | 6.0 or higher |
|  | Sticking after heat resistance test | Finger tactile sensory evaluation | Absent | Absent | Absent | Absent | Absent | Absent | Absent |
|  | Color difference change before and after heat resistance test |  | 2.7 | 2.4 | 2.5 | 2.3 | 2.5 | 2.2 | 3.0 or less |

The details of the used scratch-resistant modifiers are as follows, with the details of the other materials as described above.

Scratch-Resistant Modifier 1: trade name "Nofalloy KA832" manufactured by NOF Corporation, or a mixture of a higher fatty acid amide (estimated to be erucamide) and a compatibilizer (estimated to be a copolymer of ethylene and at least one vinyl monomer). The blending mass ratio of the higher fatty acid amide to the compatibilizer is estimated to be 2:3.

Scratch-Resistant Modifier 2: trade name "Fatty Acid Amide E" manufactured by Kao Corporation, or erucamide.

Scratch-Resistant Modifier 3: trade name "Kao Wax EB-G" manufactured by Kao Corporation, or ethylenebis (stearamide).

Using the foamable polypropylene resin compositions of Samples 18 to 34, the plate-shaped molded body 1 with a thickness of 2.8 mm was molded by a method similar to that of Samples 1 to 17. Plate-shaped test specimens having certain measurement-dependent dimensions were cut out of this plate-shaped molded body 1, the same property data as those of Samples 1 to 17 were measured, and besides, scratch resistance, sticking after heat resistance test, and a color difference change before and after heat resistance test were measured as follows as additional property data. The additional property data were measured also for Sample 1.

(E) Scratch Resistance (Scratch Characteristics)

Pursuant to ISO 19252 (JIS K7316), the surface of the test specimen was subjected to a scratch test (chip size: a diameter of 10 μm (a stainless sphere), scratch speed: 100 mm/second, and scratch distance: 100 mm) to determine a critical vertical force. The critical vertical force of 6.0 N or higher was determined to be "good."

(F) Sticking after Heat Resistance Test

The test specimen was put into a heating bath to carry out a heat resistance test of 110° C.×600 hours, and the surface of the test specimen after the heat resistance test was touched by a finger to perform sensory evaluation. The absence of sticking was evaluated to be "good."

(G) Color Difference Change Before and after Heat Resistance Test

Pursuant to ISO 11664-4 (JIS Z8781-4), the color difference change of the surface of the test specimen before and after the heat resistance test was measured. The color difference change of 3.0 or less was evaluated to be "good."

Table 3 lists the property data. The molded bodies of Samples 18 to 32 were determined to be good for the property data including flexural rigidity, high-speed surface impact, crystallinity, and average foamed cell diameter, balancing rigidity and impact resistance to a high degree, which were Examples. However, Samples 1 and 18 have room for improvement in that they are insufficient in scratch resistance. Samples 22 and 23 have room for improvement in that they have sticking after the heat resistance test and are large in the color difference change. Samples 19 to 21 and 24 to 32 were determined to be good for scratch resistance, sticking after the heat resistance test and the color difference change, which were favorable Examples.

In contrast, the molded bodies of Samples 33 and 34 were insufficient in either or both of rigidity and impact resistance, which were Comparative Examples. In addition, even though the higher fatty acid amide and the compatibilizer were added, they were insufficient in scratch resistance; it is considered that this is because the surface-untreated talc absorbed the higher fatty acid amide.

The present invention is not limited to Examples and can be embodied with alterations as appropriate without departing from the scope of the invention.

REFERENCE SIGNS LIST

1 Foamed polypropylene resin molded body
2 Foamed cell
3 Resin part between foamed cell
4 Skin layer resin part

The invention claimed is:

1. A foamable polypropylene resin composition comprising:
   100 parts by mass of a polypropylene resin,
   10 parts by mass to 65 parts by mass of rubber or a thermoplastic elastomer,
   18 parts by mass to 90 parts by mass of talc having a 50% particle diameter (D50) of 1 μm to 3 μm and surface-treated for increased dispersibility,
   0.1 part by mass to 6.0 parts by mass of an organic crystal nucleating agent that affects a crystallinity of the resin,
   5 parts by mass to 15 parts by mass of a foaming agent,
   a higher fatty acid amide; and
   a compatibilizer, wherein
   a total amount of the higher fatty acid amide and the compatibilizer is 0.8 parts by mass to 15.0 parts by mass, and
   a blending mass ratio of the higher fatty acid amide to the compatibilizer is 1:10 to 2:1.

2. The foamable polypropylene resin composition according to claim 1, wherein the talc surface-treated for increased dispersibility is talc, to a surface of which siloxane is added.

3. The foamable polypropylene resin composition according to claim 1, wherein the higher fatty acid amide is selected from the group consisting of erucamide, stearamide, oleamide, and ethylenebis(stearamide).

4. The foamable polypropylene resin composition according to claim 2, wherein the higher fatty acid amide is selected from the group consisting of erucamide, stearamide, oleamide, and ethylenebis(stearamide).

5. A foamed polypropylene resin molded body, foam-molded from the foamable polypropylene resin composition as claimed in claim 1, having closed cells in a foamed state, and having an average foamed cell diameter pursuant to ASTM D3576-77 of 100 μm to 300 μm.

6. The foamed polypropylene resin molded body according to claim 5 having a core layer and a skin layer, wherein crystallinity ($\chi c$) of a resin part between foamed cells of the core layer of the foamed polypropylene resin molded body is 30.0% or higher, and a ratio ($\chi c/\chi s$) of the crystallinity ($\chi c$) of the resin part between the foamed cells to crystallinity ($\chi s$) of a skin layer resin part of the skin layer is 1.05 or higher.

7. The foamed polypropylene resin molded body according to claim 5, wherein flexural rigidity pursuant to ISO 178 of the foamed polypropylene resin molded body is $2.0 \times 10^{-6}$ Nm or higher, and puncture energy pursuant to ISO 6603-2 of the foamed polypropylene resin molded body is 4 J or higher.

8. The foamed polypropylene resin molded body according to claim 5, wherein a critical vertical force of scratch characteristics pursuant to ISO 19252 of the foamed polypropylene resin molded body is 6.0 N or higher, and a color difference change pursuant to ISO 11664-4 of the foamed polypropylene resin molded body before and after a heat resistance test of 110° C.×600 hours is 3.0 or lower.

9. The foamed polypropylene resin molded body according to claim 6, wherein a critical vertical force of scratch characteristics pursuant to ISO 19252 of the foamed polypropylene resin molded body is 6.0 N or higher, and a color difference change pursuant to ISO 11664-4 of the foamed polypropylene resin molded body before and after a heat resistance test of 110° C.×600 hours is 3.0 or lower.

10. The foamed polypropylene resin molded body according to claim 7, wherein a critical vertical force of scratch characteristics pursuant to ISO 19252 of the foamed polypropylene resin molded body is 6.0 N or higher, and a color difference change pursuant to ISO 11664-4 of the foamed polypropylene resin molded body before and after a heat resistance test of 110° C.×600 hours is 3.0 or lower.

11. The foamable polypropylene resin composition according to claim 5, wherein the higher fatty acid amide is selected from the group consisting of erucamide, stearamide, oleamide and ethylenebis(stearamide).

12. The foamable polypropylene resin composition according to claim 6, wherein the higher fatty acid amide is selected from the group consisting of erucamide, stearamide, oleamide and ethylenebis(stearamide).

13. The foamable polypropylene resin composition according to claim 7, wherein the higher fatty acid amide is selected from the group consisting of erucamide, stearamide, oleamide and ethylenebis(stearamide).

14. The foamable polypropylene resin composition according to claim 8, wherein the higher fatty acid amide is selected from the group consisting of erucamide, stearamide, oleamide and ethylenebis(stearamide).

15. The foamable polypropylene resin composition according to claim 9, wherein the higher fatty acid amide is selected from the group consisting of erucamide, stearamide, oleamide and ethylenebis(stearamide).

16. The foamable polypropylene resin composition according to claim 10, wherein the higher fatty acid amide is selected from the group consisting of erucamide, stearamide, oleamide and ethylenebis(stearamide).

* * * * *